US008510462B2

(12) United States Patent
Riggert et al.

(10) Patent No.: US 8,510,462 B2
(45) Date of Patent: Aug. 13, 2013

(54) NETWORK STREAMING OF A VIDEO MEDIA FROM A MEDIA SERVER TO A MEDIA CLIENT

(75) Inventors: Eric Riggert, Lake Forest, CA (US); Martin Martinez, Ladera Ranch, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 12/416,059

(22) Filed: Mar. 31, 2009

(65) Prior Publication Data

US 2010/0250765 A1 Sep. 30, 2010

(51) Int. Cl.
*G06F 15/16* (2006.01)

(52) U.S. Cl.
USPC .......................... 709/232; 709/230; 709/231

(58) Field of Classification Search
USPC .......................................... 709/231, 230, 233
See application file for complete search history.

(56) References Cited

U.S. PATENT DOCUMENTS

| | | | |
|---|---|---|---|
| 4,348,186 A | 9/1982 | Harvey et al. | |
| 5,103,306 A | 4/1992 | Weiman et al. | |
| 5,682,442 A | 10/1997 | Johnston et al. | |
| 6,028,608 A | 2/2000 | Jenkins | |
| 6,959,116 B2 | 10/2005 | Sezer et al. | |
| 7,345,692 B2 | 3/2008 | Wada | |
| 7,406,123 B2 | 7/2008 | Peker et al. | |
| 7,430,329 B1 | 9/2008 | Sarna | |
| 7,502,849 B2* | 3/2009 | Roberts et al. | 709/224 |
| 7,779,142 B1* | 8/2010 | Greene et al. | 709/232 |
| 2003/0198245 A1* | 10/2003 | Bradford et al. | 370/445 |
| 2004/0230651 A1* | 11/2004 | Ivashin | 709/204 |
| 2007/0053446 A1* | 3/2007 | Spilo | 375/259 |
| 2008/0049020 A1* | 2/2008 | Gusler et al. | 345/427 |
| 2008/0069463 A1 | 3/2008 | Keeney et al. | |
| 2008/0123985 A1 | 5/2008 | Fujibayashi et al. | |
| 2008/0195745 A1* | 8/2008 | Bowra et al. | 709/231 |
| 2009/0015695 A1* | 1/2009 | Dunki-Jacobs et al. | 348/241 |
| 2009/0086650 A1* | 4/2009 | Moore et al. | 370/253 |
| 2009/0152445 A1* | 6/2009 | Gardner, Jr. | 250/214 AL |
| 2010/0159998 A1* | 6/2010 | Luke et al. | 455/567 |
| 2010/0164968 A1* | 7/2010 | Kwa et al. | 345/545 |

FOREIGN PATENT DOCUMENTS

JP 2001-306022 11/2001

OTHER PUBLICATIONS

A. B. Watson, et al., "DCT Basis Function Visibility: Effects Of Viewing Distance And Contrast Masking", Human Vision, Visual Processing, and Digital Display IV, 1994, pp. 99-108, Bellingham, WA, 1994.
S. Sedigh, et al., "Evaluation Of Filtering Mechanisms For MPEG Video Communications", School Of Electrical And Computer Engineering Purdue University, West Lafayette, IN, 1998.
Tianming Liu, et al., "Perceptual Frame Dropping In Adaptive Video Streaming", Department of Computer Science & Engineering, Shanghai Jiaotong University, Shanghai China, 2002.

* cited by examiner

*Primary Examiner* — Umar Cheema
(74) *Attorney, Agent, or Firm* — Fitzpatrick, Cella, Harper & Scinto

(57) ABSTRACT

Adjusting utilization of network bandwidth in a network comprising a media server and a media client is provided. The media client is connected to a display screen, and a video media is streamed from the media server to the media client. A distance between the display screen and a viewer is measured, and an indication of tile distance is sent to the media server. A resolution of the streaming video media is then adjusted in accordance with the indication, and the streaming video media with the updated resolution is received by the media client.

20 Claims, 7 Drawing Sheets

NETWORK STREAMING OF A VIDEO MEDIA FROM A MEDIA SERVER TO A MEDIA CLIENT

BACKGROUND

1. Field

The present disclosure generally relates to streaming media in a network, and more particularly relates to network streaming of a video media from a media server to a media client.

2. Description of the Related Art

In the field of networks, network bandwidth can be limited, especially when legacy wireless technologies are used within the network. Moreover, streaming media content within a home or other network with limited bandwidth typically taxes the performance of the network, especially if the media content is High Definition video. The result is typically a poor quality playback of the media content due to insufficient total available network bandwidth, or acceptable quality media playback at the cost of reduced availability of the network for other purposes (including additional media streams).

In the case of video streaming, the latest consumer demand for ever-higher resolution (e.g., 1920×1080 or higher), and the preference for non-interlaced rendering (e.g., 1080p is typically preferred to 1080i) increase the strain on networks with limited bandwidth. In addition, with media types such as MPEG-2 streams having a playback rate such as 20 Mbps, the problem of limited bandwidth is further exacerbated. This problem can become more severe as technology advances, and higher resolutions of video content are realized.

Thus, there is a need for systems and methods for reducing the foregoing described problems of limited network bandwidth.

SUMMARY OF THE INVENTION

Disclosed embodiments describe a method and system for adjusting utilization of network bandwidth in a network comprising a media server and a media client, the media client being connected to a display screen, in which a video media is streamed from the media server to the media client. Certain disclosed embodiments provide for measuring a distance between the display screen and a viewer, and adjusting a resolution of the streaming video media in accordance with an indication of the distance.

In one aspect of the disclosure, adjusting utilization of network bandwidth in a network comprising a media server and a media client is provided. The media client is connected to a display screen, and a video media is streamed from the media server to the media client. In this aspect, a distance between the display screen and a viewer is measured, and an indication of the distance is sent to the media server. A resolution of the streaming video media is then adjusted in accordance with the indication, and the streaming video media with the adjusted resolution is received by the media client.

In another aspect of the disclosure, the sent indication is a command from the media client to the media server to adjust the resolution of the streaming video media. When adjusting the resolution of the streaming video media, it is determined if the resolution is above or below a threshold of human visual acuity at the measured distance. In a case where the resolution is determined to be above the threshold of human visual acuity at the measured distance, the command is sent from the media client to the media server to reduce the resolution of the streaming video media to a resolution between the current resolution and the threshold of human visual acuity at the measured distance. In a case where the resolution of the streaming video media is determined to be below a threshold of human visual acuity at the measured distance, the command is sent from the media client to the media server to increase the resolution of the streaming video media to a resolution at or above the threshold of human visual acuity at the measured distance. The resolution of the streaming video media is then increased or reduced in accordance with the sent command.

By virtue of the foregoing arrangement, it is ordinarily possible to reduce network bandwidth utilized by streaming video within a network, while maintaining a quality of the video experienced by one or more viewers. More specifically, because a resolution of a streaming video media is reduced towards a threshold of human visual acuity in accordance with a measured distance between a viewer and a display screen, less network bandwidth is necessary in order to stream the video media. In addition, the picture quality of the streamed video media is maintained for the viewer at the measured distance. As a result, the streaming video media utilizes less bandwidth on the network, which in turn leaves more available bandwidth for other network applications.

In yet a further aspect of the disclosure, in the case where the resolution is determined to be above the threshold of human visual acuity at the measured distance, the media server reduces the resolution of the streaming video media to a level above the threshold of human visual acuity at the measured distance. The level is approximate, but not equal, to the threshold of human visual acuity at the measured distance. In the case where the resolution of the streaming video media is determined to be below a threshold of human visual acuity at the measured distance, the media server increases the resolution of the streaming video media to the level.

The distance between the display screen and the viewer can be measured periodically or continuously, so as to capture any change in the distance from the viewer to the display screen. In addition, the viewer can be a nearest of multiple viewers to the display screen, since the nearest viewer would be more likely to notice if the current resolution is too low. In other words, the nearest viewer would be more likely to notice that the resolution is below the threshold of human visual acuity, thereby allowing the viewer to discern the edges of individually displayed pixels.

A user can manually perform the sending of a command to the media server to adjust the resolution of the streaming video media. In addition, a user can manually perform the sending of a command to the media client to adjust the resolution of the streaming video media. When the media client receives the command from the user, the media client can then send the command to the media server.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

Figure 1:
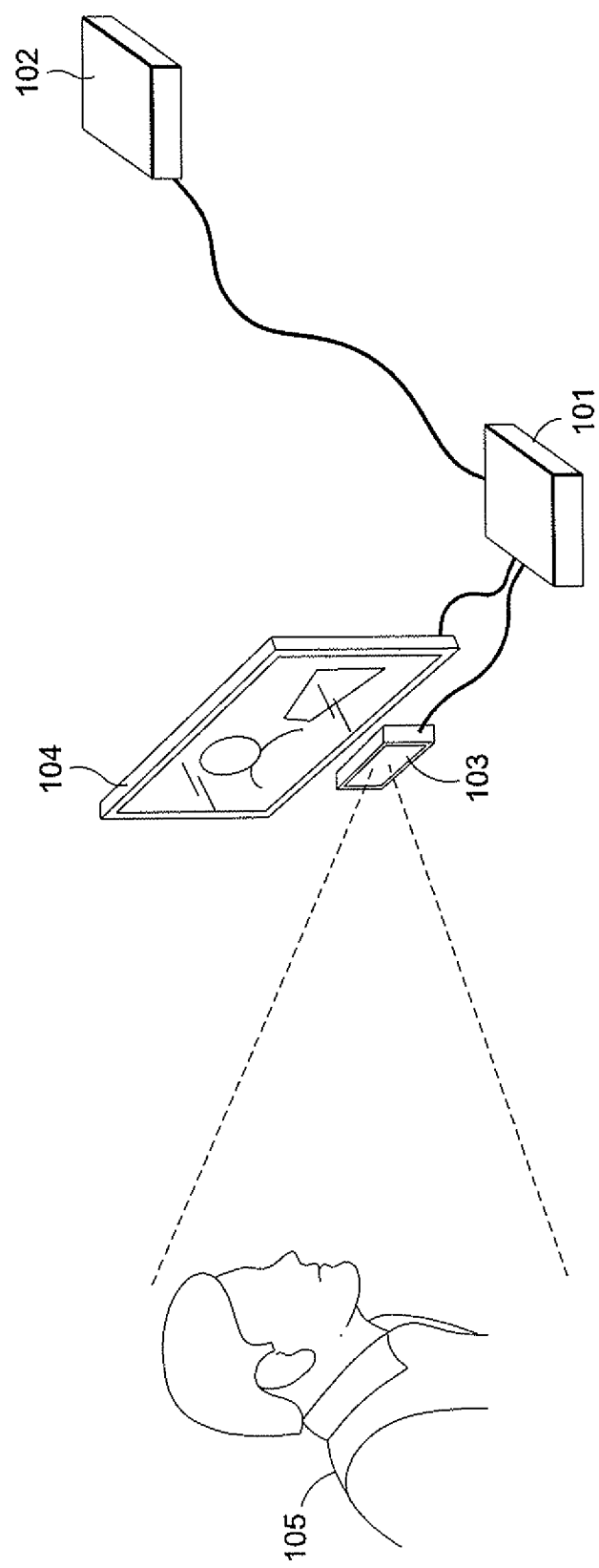
FIG. 1 is a representative view of a network in which an example embodiment may be implemented.

FIG. 1 is a representative view of a network in which an example embodiment may be implemented. As shown in FIG. 1, a media client 101 is connected to a media server 102. The media client 101 is shown to be connected via a wired network, such as an Ethernet network, through a wired network interface; however, in other embodiments, the media client 101 could be connected to the media server 102 through other networks, such as a Media over Coax Alliance (MoCA) network using coaxial cable, a wireless network using radio antennas, or another type of network configuration. In addition, in other embodiments, there may be more than one media server connected to the media client, there may be more than one media client connected to the media server, or there may be multiple media servers connected to multiple media clients.

Media client 101 is also connected to a display screen 104 and a distance measuring device 103. The display screen may be, for example, a television, a projector, or a computer screen. In FIG. 1, the display screen 104 and the distance measuring device 103 are shown to be external of the media client 101. However, in other embodiments, the media client and the display screen can be a single device, the media client and the distance measuring device can be a single device, the display screen and the distance measuring device can all be a single device, and the media client, the display screen and the distance measuring device can all be a single device.

The distance measuring device 103 measures a distance from the display screen 104 to a viewer 105. In this regard, the distance measuring device may utilize many known different methods to measure such a distance. For example, the distance measuring device may be an Electronic distance meter, a Laser rangefinder, an ultrasonic rangefinder, or even a Global Positioning System (GPS). However, the distance measuring device is not limited to the foregoing examples, and any distance measuring technology may be used as the distance measuring device.

For example, the distance measuring device 103 may acoustically measure the distance from the display screen 104 to the viewer 105. More specifically, the distance measuring device 103 may use a sound wave which bounces off objects (e.g., viewers) in the room, which creates echoes. A return time back of the sound wave, together with the known speed of sound, can then be used to determine the distance.

In another example, the distance measuring device 103 may visually measure the distance from the display screen 104 to the viewer 105 using light. More specifically, the distance measuring device 103 may use a laser or infrared diode to bounce a signal from the display screen 104 to a nearest object in the room, which in turn allows a distance measurement.

In yet another example, the distance measuring device 103 may visually measure the distance from the display screen 104 to the viewer 105 using a camera. More specifically, the distance measuring device 103 may determine the distance using estimation or a calculation derived from a picture taken by a camera included in the distance measuring device 103.

On the other hand, the distance measuring device 103 may use an auto-focus mechanism on the camera to focus on items in front of the display screen 104. In this regard, people could be discriminated between other items (e.g., pets or furniture) using a face-detection algorithm.

In an additional example, the distance may be measured using a physical measuring tape, in which a user would then manually input the distance.

In addition, the distance measuring device 103 may include a motion detection sensor (not shown). The motion detection sensor can be used by the distance measuring device 103 to initiate a measuring by the distance measuring device 103 using any one of the foregoing described measurement technologies.

In some instances, there may only be a single viewer viewing the display screen 104. In this case, the distance measuring device 103 simply measures a distance between the single viewer and the display screen 104. On the other hand, there may be multiple viewers viewing the display screen 104. In this case, the distance measuring device 103 can measure a distance from the display screen to a nearest viewer of the multiple viewers, where the nearest viewer is the viewer closest to the display screen. As a result, the distance measuring device 103 can make consistent and accurate distance measurements. In addition, when the distance measuring device 103 measures a distance between the nearest viewer of multiple viewers and the display screen, the nearest viewer will typically have the highest visual acuity at the measured distance (assuming that each individual viewer has roughly the same visual acuity) when viewing the display screen. Therefore, the nearest viewer should be more likely than the other viewers to notice any changes in resolution of streaming video media displayed on the display screen 104, as will be discussed in more detail in connection with FIGS. 4 to 7.

Figure 2:
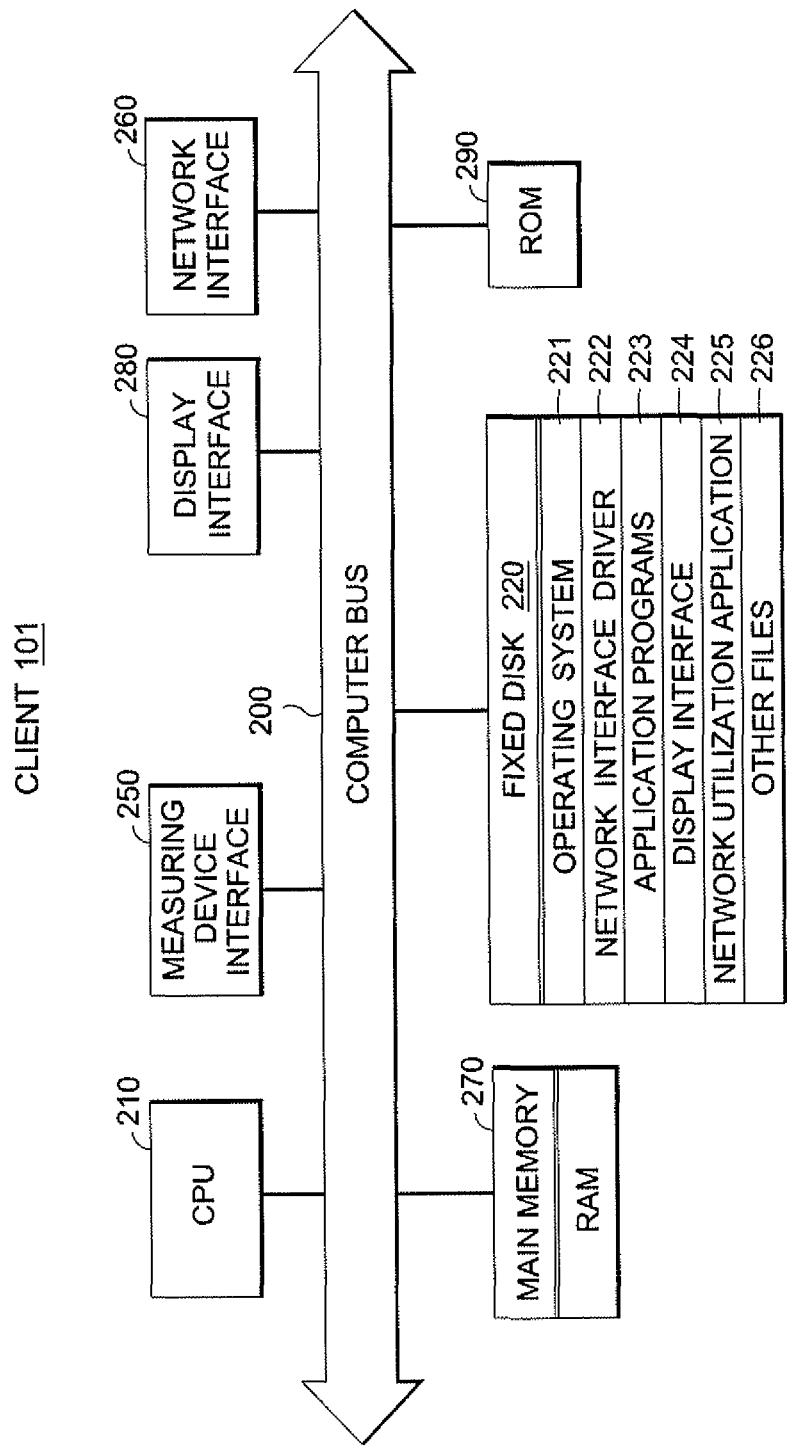
FIG. 2 is a detailed block diagram depicting the internal architecture of the media client shown in FIG. 1.

FIG. 2 is a detailed block diagram depicting the internal architecture of the media client shown in FIG. 1. As shown in FIG. 2, media client 101 includes central processing unit (CPU) 210 which interfaces with computer bus 200. Also interfacing with computer bus 200 are hard (or fixed) disk 220, measuring device interface 250, network interface 260, random access memory (RAM) 270 for use as a main runtime transient memory, display interface 280, and read only memory (ROM) 290.

RAM 270 interfaces with computer bus 200 so as to provide information stored in RAM 270 to CPU 210 during execution of the instructions in software programs such as an operating system, application programs, and interface drivers. More specifically, CPU 210 first loads computer-executable process steps from fixed disk 220, or another storage device into a region of RAM 270. CPU 210 can then execute the stored process steps from RAM 270 in order to execute the loaded computer-executable process steps. For example, data such as distances measured by the distance measuring device 103 or other information can be stored in RAM 270, so that the data can be accessed by CPU 210 during the execution of computer-executable software programs, to the extent that such software programs have a need to access and/or modify the data.

As also shown in FIG. 2, hard disk 220 contains operating system 221, network interface driver 222 for software interface to a network such as, for example, an Ethernet network, a MoCA network, a wireless network, or an Ethernet over powerline network. Hard disk 220 also contains application programs 223 such as such as programs for controlling the distance measuring device 103 or other programs. Hard disk further contains display interface 224 for software interface with a display, such as display screen 104. In addition, hard disk 220 contains network utilization application 225 for executing the processes described in more detail below in connection with FIGS. 4 to 6. Other files 226 are available for manipulation by the network utilization application 225 or other application programs.

In an example embodiment, network utilization application 225 is loaded by CPU 210 into a region of RAM 270. CPU 210 then executes the stored process steps of the network utilization application 225 from RAM 270 in order to execute the loaded computer-executable process steps. Generally, the network utilization application 225 contains processing logic configured to measure a distance between the display screen and a viewer, to send an indication of the distance to the media server, and to receive the streaming video media with an updated resolution, the resolution having been updated in accordance with the sent indication. The processes executed by the network utilization application 225 as included in the media client 101 will be described in greater detail below in connection with FIGS. 4 to 6.

Figure 3:
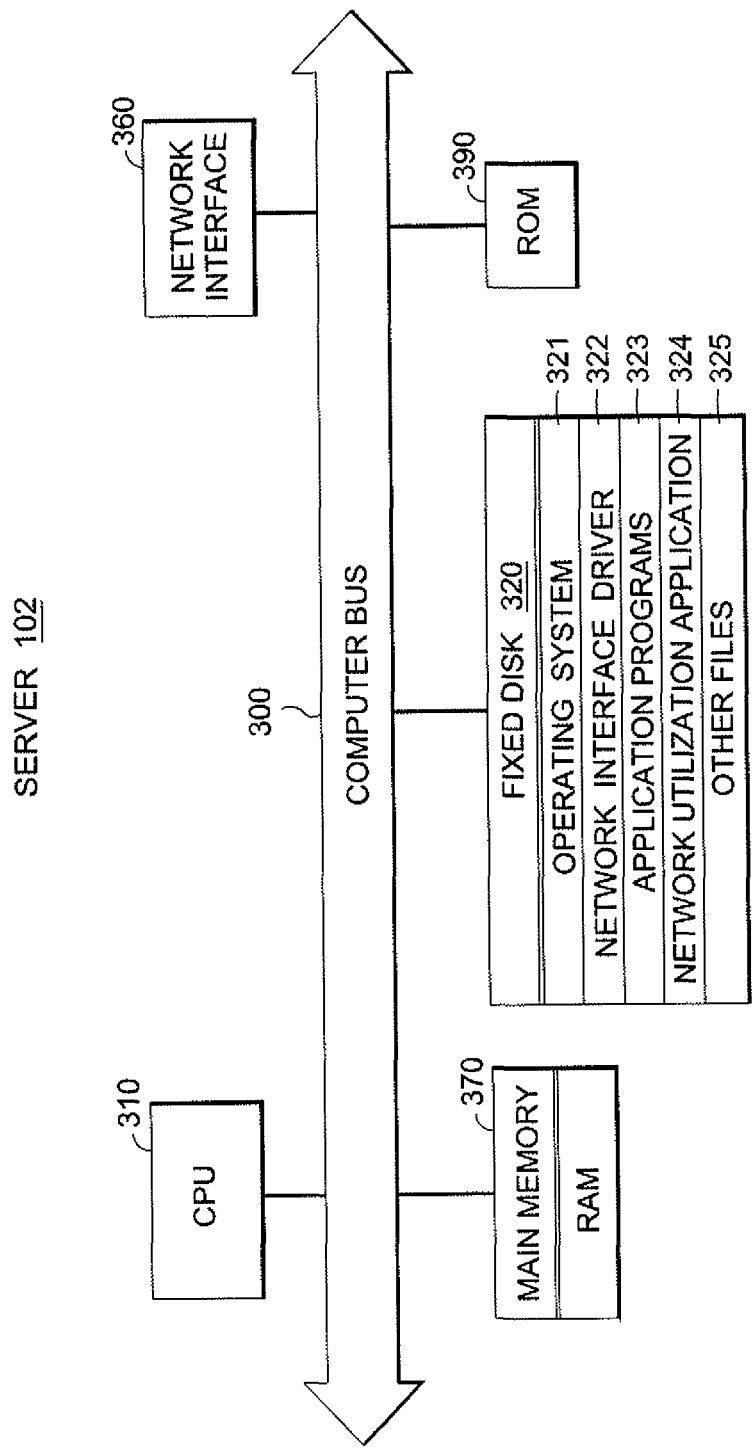
FIG. 3 is a detailed block diagram depicting the internal architecture of the media server shown in FIG. 1.

FIG. 3 is a detailed block diagram depicting the internal architecture of the media server shown in FIG. 1. As shown in FIG. 3, media server 102 includes central processing unit (CPU) 310 which interfaces with computer bus 300. Also interfacing with computer bus 300 are hard (or fixed) disk 320, network interface 360, random access memory (RAM) 370 for use as a main run-time transient memory, and read only memory (ROM) 390.

RAM 370 interfaces with computer bus 300 so as to provide information stored in RAM 370 to CPU 310 during execution of the instructions in software programs such as an operating system, application programs, and device drivers. More specifically, CPU 310 first loads computer-executable process steps from fixed disk 320, or another storage device into a region of RAM 370. CPU 310 can then execute the stored process steps from RAM 370 in order to execute the loaded computer-executable process steps. For example, data such as measurements or other information can be stored in RAM 370, so that the data can be accessed by CPU 310 during the execution of computer-executable software programs, to the extent that such software programs have a need to access and/or modify the data.

As also shown in FIG. 3, hard disk 320 contains operating system 321, network interface driver 322 for software interface to a network such as, for example, an Ethernet network, a MoCA network, a wireless network, or an Ethernet over powerline network. Hard disk 320 also contains application programs 323 such as programs for sending different types of media over different types of networks. In addition, hard disk 320 includes network utilization application 324 for executing the processes described in more detail below in connection with FIGS. 4, 5 and 7. Other files 325 are available for manipulation by the network utilization application 324 or other application programs.

In an example embodiment, network utilization application 324 is loaded by CPU 310 into a region of RAM 370. CPU 300 then executes the stored process steps of the network utilization application 324 from RAM 370 in order to execute the loaded computer-executable process steps. Generally, the network utilization application 324 contains processing logic configured to adjust a resolution of the streaming video media in accordance with a received indication, in which the received indication is an indication of a distance between the display screen 104 and the viewer 105, measured and sent by the media client 101. The processes executed by the network utilization application 324 as included in the media server 102 will be described in greater detail below in connection with FIGS. 4, 5 and 7.

In order to better understand the processes as described below in FIGS. 4 to 7, a general explanation of resolution of a display screen, human visual acuity, and the correlation between human visual acuity and distance will now be provided.

The resolution of a display refers to the number of distinct pixels in each dimension that can be displayed. In this regard, the size of the display has an effect on the resolution of the display. For a given size of the display, when the resolution increases, the size of an individual pixel in the display decreases. Moreover, for a given size of the display, when the resolution decreases, the size of an individual pixel in the display increases. Thus, when a resolution is said to be "high", the pixels are smaller than when the resolution is said to be "low".

Human visual acuity is defined as the acuteness or clearness of human vision. In other words, human visual acuity is the ability of a human to visually resolve fine detail. In terms of resolution of a display, human visual acuity is the human's ability to resolve individual pixels on the display. A threshold of human visual acuity for the resolution of a display is the point at which a human can resolve the individual pixels. Thus, if the resolution of the display is said to be above the threshold of human visual acuity, then the human cannot discern between the individual pixels. On the other hand, if the resolution of the display is said to be below the threshold of human visual acuity, then the human can discern between the individual pixels.

The above-described threshold of human visual acuity will vary depending on the distance a viewer is positioned from a display. As the viewer gets closer to the display, the viewer becomes more capable of discerning between the individual pixels of the display. As the viewer moves away from the display, the viewer becomes less capable of discerning between the individual pixels. In addition, the threshold of human visual acuity for resolution of the display depends on the display's dimensions. Furthermore, empirical data may be gathered regarding the relationship between the threshold of human visual acuity, a distance between a viewer and a display screen, and the display screen's dimensions. This gathered empirical data can then be used in the implementation of the processes described below in connection with FIGS. 4 to 7.

Figure 4:
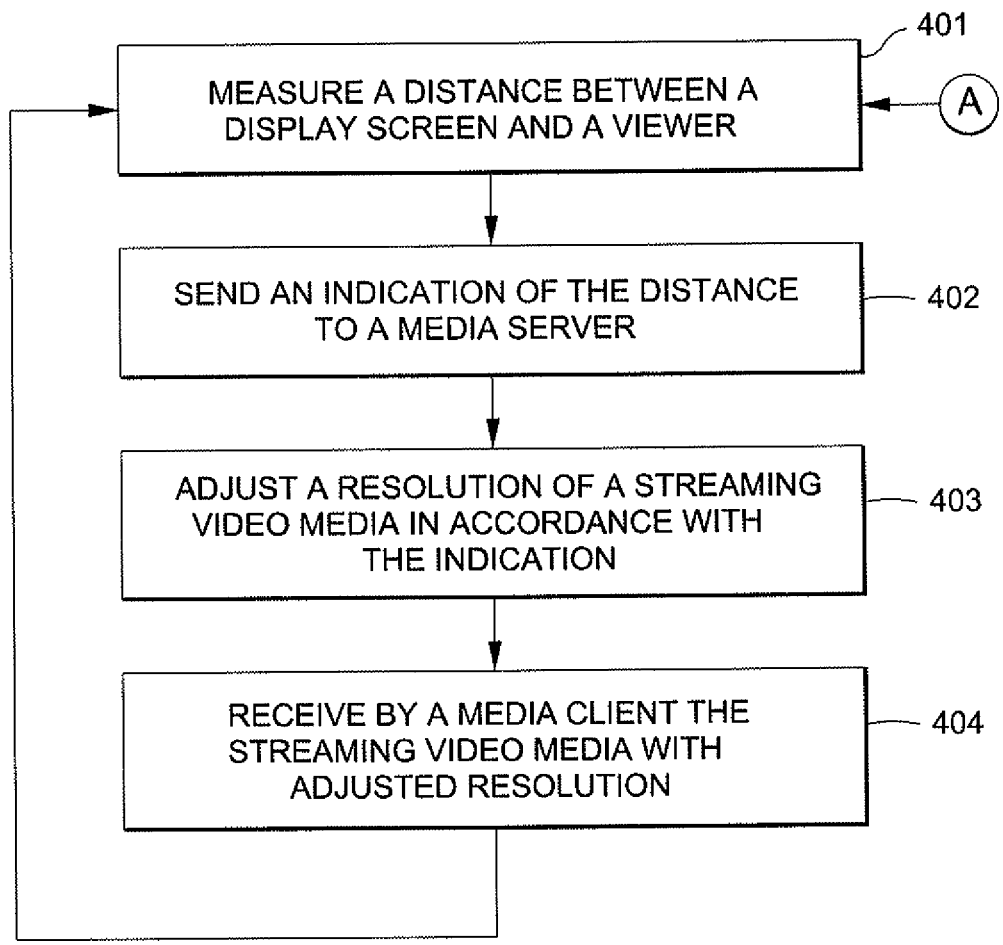
FIG. 4 is a flowchart for illustrating a process according to an example embodiment.

FIG. 4 is a flowchart for illustrating a process according to an example embodiment. More specifically, FIG. 4 shows a process for adjusting utilization of network bandwidth in a network including the media server 102 and the media client 101. As discussed above in connection with FIG. 1, the media client 101 is connected to the display screen 104, and a video media is streamed from the media server 102 to the media client 101.

As shown in FIG. 4, a distance between a display screen (e.g., display screen 104) and a viewer (e.g., viewer 105) is measured (block 401). In this regard, the media client 101 controls the distance measuring device 103 to perform distance measurements from the display screen 104 to the viewer 105. As discussed above in connection with FIG. 1, the viewer 105 may be a single viewer or may be one of multiple viewers. In the case the viewer 105 is one of multiple viewers, the distance is typically measured between the display screen 104 and a nearest of the multiple viewers. In addition, the media client 101 may control the distance measuring device 103 to measure the distance from the display screen 104 to the nearest viewer continuously or periodically. When measuring periodically, the time between distance measurements is set to be short enough so that any change in position of the viewer, or a change in which one of the multiple viewers is the nearest viewer, can be accounted for and measured by the distance measuring device 103.

In another example embodiment, the distance measuring device 103 may use the motion detection sensor in order to know when to measure the distance from the display screen 104 to the viewer 105. More specifically, in this example embodiment, the distance measuring device 103 would measure the distance from the display screen 104 and a nearest viewer upon detection of any movement.

In block 402, an indication of the distance is sent to the media server 102. In one example embodiment, the sent indication is a command from the media client 101 to the media server 102 to adjust the resolution of the streaming video media. In another example embodiment, the sent indication is the measured distance. In the case where the sent indication is the measured distance, the media server 102 determines itself whether to adjust the resolution of the streaming video media, as described in greater detail below in connection with FIG. 7. A resolution of the streaming video media is then adjusted in accordance with the indication (block 403). The streaming video media with the adjusted resolution is then received by the media client (block 404). The adjusting of the resolution of the streaming video media will now be described in more detail with regard to FIG. 5.

Figure 5:
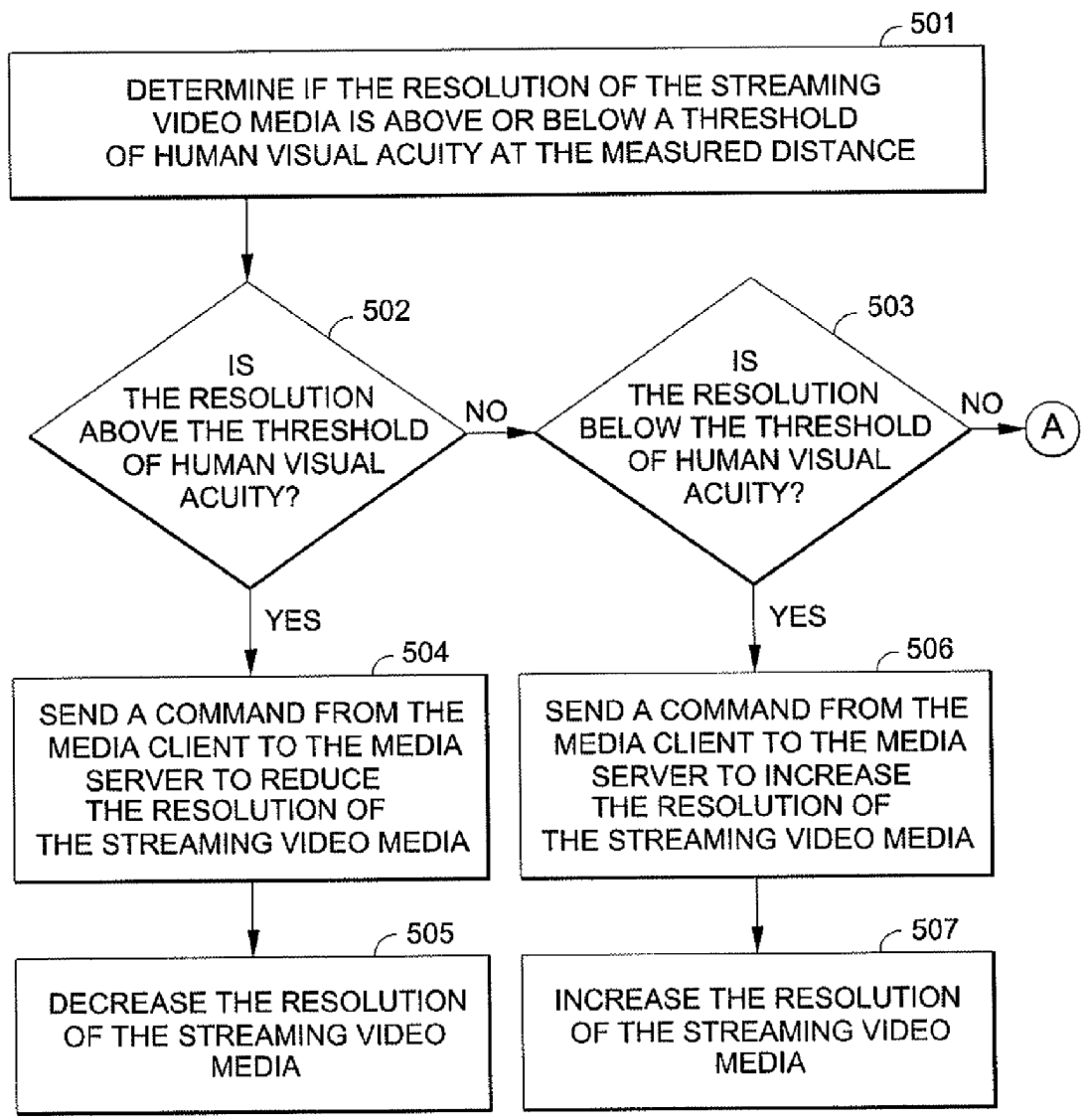
FIG. 5 is a flowchart for further defining an adjusting of block 403 of FIG. 4.

FIG. 5 is a flowchart for further defining the adjusting in block 403 of FIG. 4. As shown in FIG. 5, the resolution of the streaming video media is determined to be above or below a threshold of human visual acuity at the measured distance (block 501). As noted above, resolution above a threshold of human visual acuity corresponds with when the viewer cannot resolve the individual pixels, and resolution below a threshold of human visual acuity corresponds with when the viewer can resolve the individual pixels. If the resolution of the streaming video media is determined to be above the threshold of human visual acuity at the measured distance (block 502), then a command is sent from the media client 101 to the media server 102 to reduce the resolution of the streaming video media to a resolution between the current resolution of the streaming video media and the threshold of human visual acuity at the measured distance (block 504). The resolution of the streaming video media is then decreased by the media server 102 in accordance with the command sent by the media client 101 (block 505). If the resolution of the streaming video media is determined to be below the threshold of human visual acuity at the measured distance (block 503), then a command is sent from the media client 101 to the media server 102 to increase the resolution of the streaming video media to a resolution at or above the threshold of human visual acuity at the measured distance (block 506). The resolution of the streaming video media is then increased by the media server 102 in accordance with the command sent by the media client 101 (block 507). If in block 503, the resolution of the streaming video media is determined to not be below the threshold of human visual acuity at the measured distance, then the process returns to block 401 of FIG. 4.

By virtue of the foregoing example embodiments, it is ordinarily possible to reduce network bandwidth utilized by streaming video within a network, while maintaining a quality of the video experienced by one or more viewers. More specifically, because a resolution of a streaming video media is reduced towards a threshold of human visual acuity in accordance with a measured distance between a viewer and a display screen, less network bandwidth is necessary in order to stream the video media. In addition, the picture quality of the streamed video media is maintained for the viewer at the measured distance. As a result, the streaming video media utilizes less bandwidth on the network, which in turn can improve quality playback when available network bandwidth is insufficient, and can leave more available bandwidth for other network applications.

In an example embodiment, in the case where the resolution is determined to be above the threshold of human visual acuity at the measured distance as shown in block 502 of FIG. 5, the media server 102 reduces the resolution of the streaming video media to a level above the threshold of human visual acuity at the measured distance. The level is approximate, but not equal, to the threshold of human visual acuity at the measured distance. In the case where the resolution of the streaming video media is determined to be below a threshold of human visual acuity at the measured distance as shown in block 503 of FIG. 5, the media server 102 increases the resolution of the streaming video media to the level. In other words, the media server 102 is adjusting the resolution of the streaming video media to a resolution level which is very close to the threshold of human visual acuity. However, if the resolution of the display screen is determined to be equal to the level at the measured distance, or determined to be between the threshold of human visual acuity and the level at the measured distance (or an acceptable range within the threshold), then the resolution is not further adjusted. Because the resolution is being reduced to a level very close to the threshold of human visual acuity, the data size of the streaming video media can be greatly reduced, which in turn greatly reduces the network bandwidth utilized by the streaming video media. In addition, because the resolution is kept at a level very close to the threshold of human visual acuity, the quality of the video displayed on the display screen, as perceived by the viewer or multiple viewers, is maintained.

In another example embodiment, a user can manually perform the sending of a command to the media server to adjust the resolution of the streaming video media. In addition, in yet another example embodiment, a user can manually perform the sending of a command to the media client to adjust the resolution of the streaming video media. When the media client receives the command from the user, the media client can then send the command to the media server. Accordingly, the user can choose to override the processes of network bandwidth utilization at anytime.

Figure 6:
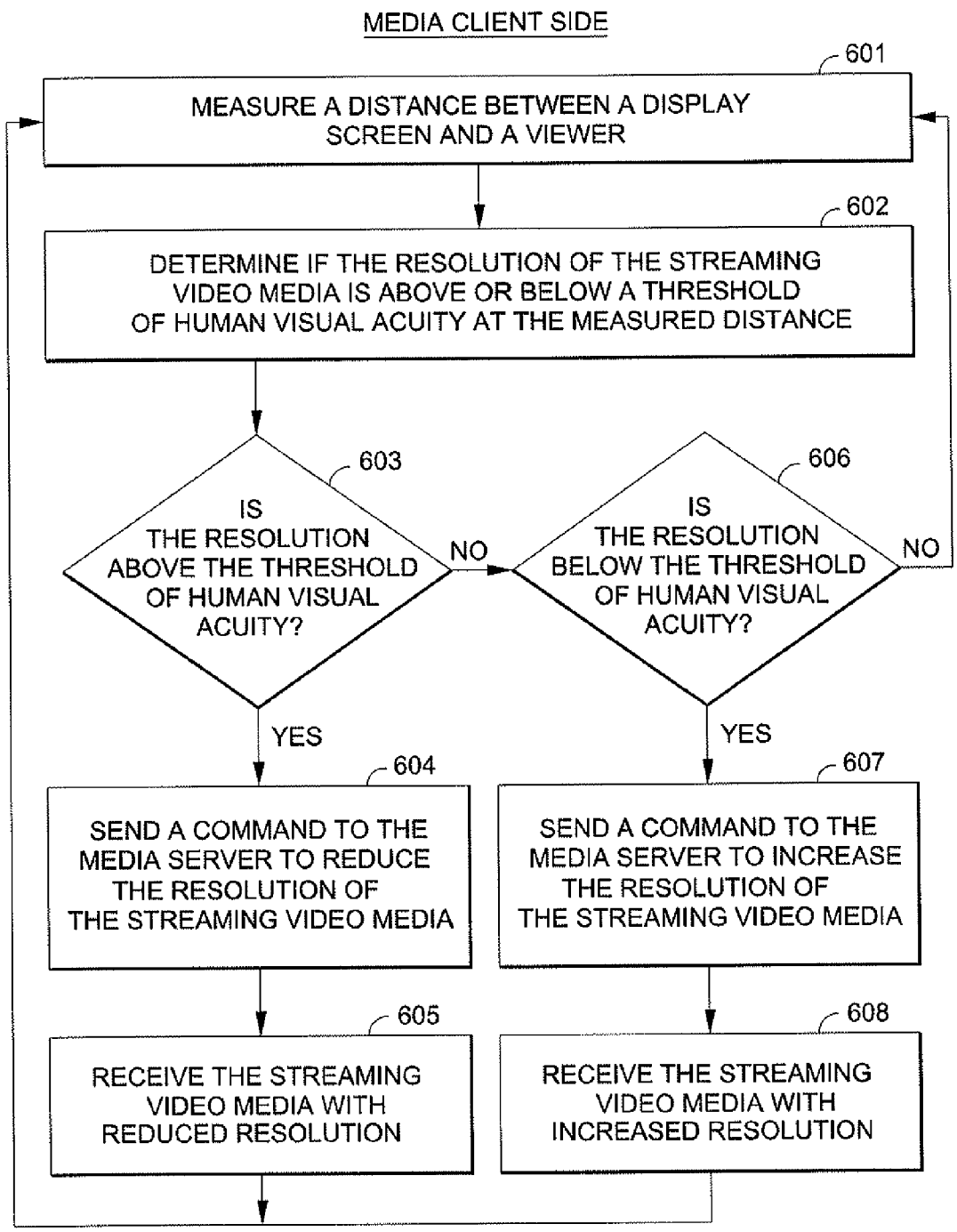
FIG. 6 is a flowchart for illustrating a process performed by the media client shown in FIG. 1 according to an example embodiment.

FIG. 6 is a flowchart for illustrating a process performed by the media client shown in FIG. 1 according to an example embodiment. More specifically, FIG. 6 shows a process for adjusting utilization of network bandwidth in a network including the media server 102 and the media client 101 of FIG. 1. In this regard, FIG. 6 illustrates a process for adjusting utilization of network bandwidth, but is only directed to the processes executed by the media client 101. As discussed above in connection with FIG. 1, the media client 101 is connected to the display screen 104, and a video media is streamed from the media server 102 to the media client 101.

As shown in FIG. 6, a distance between the display screen 104 and the viewer 105 is measured (block 601). In particular, the media client 101 controls the distance measuring device 103 so as to measure a nearest viewer of multiple viewers. Then, the media client 102 determines if the resolution of the streaming video media is above or below a threshold of human visual acuity at the measured distance (block 602). If the resolution of the streaming video media is determined to be above the threshold of human visual acuity at the measured distance (block 603), then the media client 101 sends a command to the media server 102 to reduce the resolution of the streaming video media to a resolution between the current resolution and the threshold of human visual acuity at the measured distance (block 604). The media client 101 then receives the streaming video media with reduced resolution from the media server 102 (block 605), and displays the streaming video media with reduced resolution on the display screen 104.

If the resolution of the streaming video media is determined to be below the threshold of human visual acuity at the measured distance (block 606), then the media client 101 sends a command to the media server 102 to increase the resolution of the streaming video media to a resolution at or above the threshold of human visual acuity at the measured distance (block 607). The media client then receives the streaming video media with increased resolution from the media server 102 (block 608), and displays the streaming video media with increased resolution on the display screen 104. In a case that the resolution of the streaming video media is at the threshold of human visual acuity (or an acceptable range within) at the measured distance, then the process returns to block 601 and the media client 101 measures a distance between the display screen 104 and the viewer 105. As discussed above, the distance may be measured continuously or periodically, so that there may be a period of time before the media client 101 again measures a distance between the display screen 104 and the viewer 105.

Figure 7:
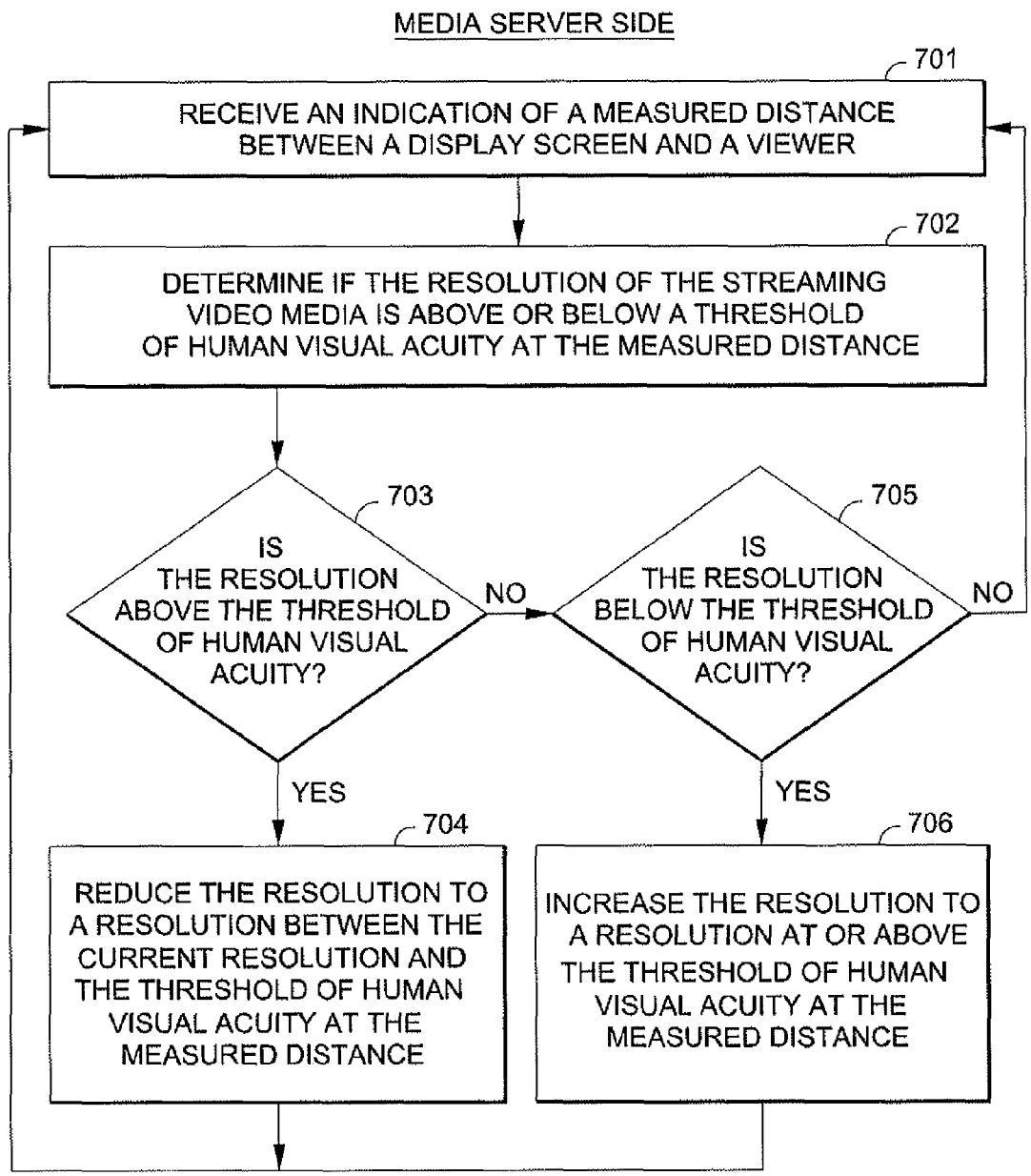
FIG. 7 is a flowchart for illustrating a process performed by the media server shown in FIG. 1 according to an example embodiment.

FIG. 7 is a flowchart for illustrating a process performed by the media server shown in FIG. 1 according to an example embodiment. More specifically, FIG. 7 shows a process for adjusting utilization of network bandwidth in a network including the media server 102 and the media client 101 of FIG. 1. In this regard, FIG. 7 illustrates a process for adjusting utilization of network bandwidth, but is only directed to the roles played by the media server 102. As discussed above in connection with FIG. 1, the media client 101 is connected to the display screen 104, and a video media is streamed from the media server 102 to the media client 101.

As shown in FIG. 7, the media server 102 receives an indication of a measured distance between the display screen 104 and the viewer 105 (block 701). In this regard, the media client 101 has controlled the distance measuring device 103 to measure the distance between the display screen 104 and the viewer 105, and sent an indication of the measured distance to the media server 102. Then, the media server 102 determines if the resolution of the streaming video media is above or below a threshold of human visual acuity at the measured distance (block 702). If the resolution is determined to be above the threshold of human visual acuity at the measured distance (block 703), then the media server 102 reduces the resolution of the streaming video media to a resolution between the current resolution and the threshold of human visual acuity at the measured distance (block 704). The streaming video media with reduced resolution is then sent to the media client 101 and displayed on the display screen 104.

If the resolution is determined to be below the threshold of human visual acuity at the measured distance (block 705), then the media server 102 increases the resolution to a resolution at or above the threshold of human visual acuity at the measured distance (block 706). The streaming video media with reduced resolution is then sent to the media client 101 and displayed on the display screen 104. The process of FIG. 7 then repeats itself in a continuous or periodic fashion. In addition, in a case that the resolution of the streaming video media is determined to be at the threshold of human visual acuity (or an acceptable range within) at the measured distance in block 702, then the process returns to block 701 and begins again. As discussed above, the distance may be measured continuously or periodically, so that there may be a period of time before the media client 101 again measures a distance between the display screen 104 and the viewer 105.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for adjusting utilization of network bandwidth in a network comprising a media server and a media client, the media client being connected to a display screen, wherein a video media is streamed from the media server to the media client, the method comprising:

measuring a distance between the display screen and a viewer; obtaining a threshold of human visual acuity, wherein a human eye can discern between individual pixels of the streaming video media when a resolution of the streaming video media is determined to be below the threshold of human visual acuity;

determining if the resolution of the streaming video media is below the threshold of human visual acuity at the measured distance, wherein the determination is based on the threshold of human visual acuity and based on the measured distance;

increasing the resolution of the streaming video media to a resolution at or above the threshold of human visual acuity at the measured distance in a case where the resolution of the streaming video media is determined to be below the threshold of human visual acuity at the measured distance;

reducing the resolution of the streaming video media to a resolution between the current resolution and the threshold of human visual acuity at the measured distance in a case where the resolution is determined to be above the threshold of human visual acuity at the measured distance; and receiving by the media client the streaming video media with the increased or reduced resolution.

2. A method according to claim 1, further comprising sending a command from the media client to the media server to adjust the resolution of the streaming video media.

3. A method according to claim 1, wherein the measured distance is sent from the media client to the media server.

4. A method according to claim 2, further comprising:

in a case where the resolution is determined to be above the threshold of human visual acuity at the measured distance, the command sent from the media client to the media server indicates to reduce the resolution of the streaming video media to a resolution between the current resolution and the threshold of human visual acuity at the measured distance;

in a case where the resolution of the streaming video media is determined to be below the threshold of human visual acuity at the measured distance, the command sent from the media client to the media server indicates to increase the resolution of the streaming video media to a resolution at or above the threshold of human visual acuity at the measured distance; and increasing or decreasing the resolution of the streaming video media in accordance with the sent command.

5. A method according to claim 2, wherein a user manually performs the sending of the command to the media server to adjust the resolution of the streaming video media.

6. A method according to claim 2, wherein a user manually performs the sending of the command to the media client to adjust the resolution of the streaming video media, and wherein when the media client receives the command from the user, the media client sends the command to the media server.

7. A method according to claim 1, wherein the distance between the display screen and the viewer is measured periodically.

8. A method according to claim 1, wherein the distance between the display screen and the viewer is measured continuously.

9. A method according to claim 1, wherein the viewer is a nearest of multiple viewers to the display screen.

10. A method according to claim 4, wherein in the case where the resolution is determined to be above the threshold of human visual acuity at the measured distance, the media server reduces the resolution of the streaming video media to a level above the threshold of human visual acuity at the measured distance, wherein the level is approximate, but not equal, to the threshold of human visual acuity at the measured distance, and wherein in the case where the resolution of the streaming
video media is determined to be below a threshold of human visual acuity at the measured distance, the media server increases the resolution of the streaming video media to the level.

11. A method for adjusting utilization of network bandwidth in a network comprising a media server and a media client, the media client being connected to a display screen, wherein a video media is streamed from the media server to the media client, and wherein in said method the media client performs the steps of:
measuring a distance between the display screen and a viewer; obtaining a threshold of human visual acuity, wherein a human eye can discern between individual pixels of the streaming video media when a resolution of the streaming video media is determined to be below the threshold of human visual acuity;
determining if the resolution of the streaming video media is below the threshold of human visual acuity at the measured distance, wherein the determination is based on the threshold of human visual acuity and based on the measured distance;
sending a command to the media server to increase the resolution of the streaming video media to a resolution at or above the threshold of human visual acuity at the measured distance in a case where the resolution of the streaming video media is determined to be below the threshold of human visual acuity at the measured distance;
sending the command to the media server to reduce the resolution of the streaming video media to a resolution between the current resolution and the threshold of human visual acuity at the measured distance in a case where the resolution is determined to be above the threshold of human visual acuity at the measured distance; and receiving the streaming video media with the increased or reduced resolution.

12. A method according to claim 11, wherein said media client performs the steps of: in a case where the resolution is determined to be above the threshold of human visual acuity at the measured distance, the command sent to the media server indicates to reduce the resolution of the streaming video media to a resolution between the current resolution and the threshold of human visual acuity at the measured distance; and
in a case where the resolution of the streaming video media is determined to be below a threshold of human visual acuity at the measured distance, the command sent to the media server indicates to increase the resolution of the streaming video media to a resolution at or above the threshold of human visual acuity at the measured distance,
wherein the resolution of the streaming video media is increased or reduced by the media server in accordance with the sent command.

13. A non-transitory computer-readable medium on which is stored computer-executable process steps to be executed on a computer, the computer-executable process steps for adjusting utilization of network bandwidth in a network comprising a media server and a media client, the media client being connected to a display screen, wherein a video media is streamed from the media server to the media client, said computer-executable process steps comprising process steps executable to perform a method according to any of claims 11 and 12.

14. A method for adjusting utilization of network bandwidth in a network comprising a media server and a media client, the media client being connected to a display screen, wherein a video media is streamed from the media server to the media client, and wherein in said method the media server performs the steps of:
obtaining a threshold of human visual acuity, wherein a human eye can discern between individual pixels of the streaming video media when a resolution of the streaming video media is determined to be below the threshold of human visual acuity;
determining if the resolution of the streaming video media is below the threshold of human visual acuity at a distance between the display screen and a viewer in accordance with an indication received from the media client, wherein the determination is based on the threshold of human visual acuity and based on the distance;
increasing a resolution of the streaming video media to a resolution at or above the threshold of human visual acuity at the distance in a case where the resolution of the streaming video media is determined to be below the threshold of human visual acuity at the distance; and
reducing the resolution of the streaming video media to a resolution between the current resolution and the threshold of human visual acuity at the distance in a case where the resolution is determined to be above the threshold of human visual acuity at the distance, wherein the received indication is an indication of the distance between the display screen and the viewer, measured and sent by the media client.

15. A method according to claim 14, wherein the media server further performs the steps of:
in a case where the resolution is determined to be above the threshold of human visual acuity at the distance, reducing the resolution of the streaming video media to a resolution between the current resolution and the threshold of human visual acuity at the distance; and
in a case where the resolution of the streaming video media is determined to be below a threshold of human visual acuity at the distance, increasing the resolution of the streaming video media to a resolution at or above the threshold of human visual acuity at the distance.

16. A non-transitory computer-readable medium on which is stored computer-executable process steps to be executed by a computer, the computer-executable process steps for adjusting utilization of network bandwidth in a network comprising a media server and a media client, the media client being connected to a display screen, wherein a video media is streamed from the media server to the media client, said computer-executable process steps comprising process steps executable to perform a method according to any of claims 14 and 15.

17. A media client for adjusting utilization of network bandwidth in a network comprising a media server and the media client, the media client being connected to a display screen, wherein a video media is streamed from the media server to the media client, the media client comprising:
- a storage device which stores computer-executable instructions; and
- a processor coupled to the storage device and constructed to execute the computer-executable program instructions stored in the storage device,
- wherein the computer-executable program instructions stored in the storage device comprise instructions to:
- measure a distance between the display screen and a viewer;
- obtain a threshold of human visual acuity, wherein a human eye can discern between individual pixels of the streaming video media when a resolution of the streaming video media is determined to be below the threshold of human visual acuity;
- determine if the resolution of the streaming video media is above or below the threshold of human visual acuity at the measured distance, wherein the determination is based on the threshold of human visual acuity and based on the measured distance;
- send a command to the media server to increase the resolution of the streaming video media to a resolution at or above the threshold of human visual acuity at the measured distance in a case where the resolution of the streaming video media is determined to be below the threshold of human visual acuity at the measured distance;
- send the command to the media server to reduce the resolution of the streaming video media to a resolution between the current resolution and the threshold of human visual acuity at the measured distance in a case where the resolution is determined to be above the threshold of human visual acuity at the measured distance; and
- receive the streaming video media with the increased resolution.

18. A media client according to claim 17, wherein computer-executable program instructions stored in the storage device further comprise instructions to:
- in a case where the resolution is determined to be above the threshold of human visual acuity at the measured distance, the command sent to the media server indicates to reduce the resolution of the streaming video media to a resolution between the current resolution and the threshold of human visual acuity at the measured distance; and
- in a case where the resolution of the streaming video media is determined to be below a threshold of human visual acuity at the measured distance, the command sent to the media server indicates to increase the resolution of the streaming video media to a resolution at or above the threshold of human visual acuity at the measured distance, wherein the resolution of the streaming video media is increased or reduced by the media server in accordance with the sent command.

19. A media server for reducing utilization of network bandwidth in a network comprising the media server and a media client, the media client being connected to a display screen, wherein a video media is streamed from the media server to the media client, the media server comprising:
- a storage device which stores computer-executable instructions; and
- a processor coupled to the storage device and constructed to execute the computer-executable program instructions stored in the storage device,
- wherein the computer-executable program instructions stored in the storage device comprise instructions to:
- obtain a threshold of human visual acuity, wherein a human eye can discern between individual pixels of the streaming video media when a resolution of the streaming video media is determined to be below the threshold of human visual acuity:
- determine if the resolution of the streaming video media is below the threshold of human visual acuity at a distance between the display screen and a viewer in accordance with an indication received from the media client, wherein the determination is based on the threshold of human visual acuity and based on the distance;
- increase a resolution of the streaming video media to a resolution at or above the threshold of human visual acuity at the distance in a case where the resolution of the streaming video media is determined to be below the threshold of human visual acuity at the distance; and
- reduce the resolution of the streaming video media to a resolution between the current resolution and the threshold of human visual acuity at the distance in a case where the resolution is determined to be above the threshold of human visual acuity at the distance,
- wherein the received indication is an indication of the distance between the display screen and the viewer, measured and sent by the media client.

20. A media server according to claim 19, wherein the computer-executable program instructions stored in the storage device further comprise instructions to:
- in a case where the resolution is determined to be above the threshold of human visual acuity at the distance, decrease the resolution of the streaming video media to a resolution between the current resolution and the threshold of human visual acuity at the distance; and
- in a case where the resolution of the streaming video media is determined to be below a threshold of human visual acuity at the distance, increase the resolution of the streaming video media to a resolution at or above the threshold of human visual acuity at the distance.

* * * * *